(12) United States Patent
Bouillon et al.

(10) Patent No.: US 8,846,218 B2
(45) Date of Patent: Sep. 30, 2014

(54) PROCESS FOR SMOOTHING THE SURFACE OF A PART MADE OF CMC MATERIAL

(75) Inventors: Eric Bouillon, Le Haillan (FR); Nicolas Eberling-Fux, Talence (FR); Serge Chateigner, Pessac (FR)

(73) Assignees: Herakles, Le Haillan (FR); SNECMA, Paris (FR)

( * ) Notice: Subject to any disclaimer, the term of this patent is extended or adjusted under 35 U.S.C. 154(b) by 315 days.

(21) Appl. No.: 13/262,120

(22) PCT Filed: Mar. 31, 2010

(86) PCT No.: PCT/FR2010/050606
§ 371 (c)(1),
(2), (4) Date: Nov. 8, 2011

(87) PCT Pub. No.: WO2010/112768
PCT Pub. Date: Oct. 7, 2010

(65) Prior Publication Data
US 2012/0063912 A1   Mar. 15, 2012

(30) Foreign Application Priority Data

Apr. 2, 2009  (FR) .................................... 09 52114

(51) Int. Cl.
| | |
|---|---|
| *B32B 9/00* | (2006.01) |
| *B32B 15/04* | (2006.01) |
| *B32B 19/00* | (2006.01) |
| *F03B 3/12* | (2006.01) |
| *C03C 3/087* | (2006.01) |
| *F01D 5/28* | (2006.01) |
| *C04B 41/89* | (2006.01) |
| *C04B 41/50* | (2006.01) |
| *C04B 41/00* | (2006.01) |
| *C03C 8/00* | (2006.01) |
| *C04B 41/86* | (2006.01) |
| *C04B 41/52* | (2006.01) |

(52) U.S. Cl.
CPC ............... *C04B 41/86* (2013.01); *F01D 5/282* (2013.01); *C04B 41/89* (2013.01); *C04B 41/5022* (2013.01); *C04B 41/009* (2013.01); *Y02T 50/67* (2013.01); *Y02T 50/673* (2013.01); *Y02T 50/672* (2013.01); *C03C 3/087* (2013.01); *C03C 8/00* (2013.01); *C04B 41/52* (2013.01); *F05D 2230/90* (2013.01); *F05D 2230/312* (2013.01); *F05D 2230/311* (2013.01); *F05D 2300/611* (2013.01)
USPC ................... 428/702; 416/241 B; 416/241 R; 428/471; 428/472; 428/701; 501/55; 501/68; 501/69; 501/70

(58) Field of Classification Search
USPC .......... 416/241 B, 241 R; 428/471, 472, 701, 428/702; 501/55, 68, 69, 70
See application file for complete search history.

(56) References Cited

U.S. PATENT DOCUMENTS

| | | | |
|---|---|---|---|
| 5,246,736 | A | 9/1993 | Goujard et al. |
| 5,622,751 | A | 4/1997 | Thebault et al. |

(Continued)

FOREIGN PATENT DOCUMENTS

| | | |
|---|---|---|
| FR | 2 401 888 | 3/1979 |
| FR | 2 850 649 | 8/2004 |

(Continued)

OTHER PUBLICATIONS

International Search Report as issued for PCT/FR2010/050606.

*Primary Examiner* — Jonathan Langman
(74) *Attorney, Agent, or Firm* — Pillsbury Winthrop Shaw Pittman, LLP (57) ABSTRACT

A method of smoothing the surface of a ceramic matrix composite material part that presents a surface that is undulating and rough. The method includes depositing a refractory vitreous coating on the surface of the part, the vitreous coating essentially containing silica, alumina, baryte, and lime.

5 Claims, 4 Drawing Sheets

(56) References Cited

U.S. PATENT DOCUMENTS

| | | |
|---|---|---|
| 5,965,266 A | 10/1999 | Goujard et al. |
| 6,068,930 A | 5/2000 | Lamouroux et al. |
| 6,291,058 B1 | 9/2001 | Goujard et al. |
| 2006/0128548 A1* | 6/2006 | Carper et al. .................. 501/17 |
| 2006/0141154 A1 | 6/2006 | Thebault |
| 2009/0169873 A1* | 7/2009 | Louchet-Pouillerie et al. ........................ 428/334 |

FOREIGN PATENT DOCUMENTS

| | | | |
|---|---|---|---|
| FR | 2 899 226 | 10/2007 | |
| FR | WO/2007/116176 | * 10/2007 | ............. C23C 28/04 |

* cited by examiner

PROCESS FOR SMOOTHING THE SURFACE OF A PART MADE OF CMC MATERIAL

CROSS REFERENCE TO RELATED APPLICATIONS

This application is the U.S. National Stage of PCT/FR2010/050606, filed Mar. 31, 2010, which in turn claims priority to French Patent Application No. 0952114, filed Apr. 2, 2009, the entire contents of all applications are incorporated herein by reference in their entireties.

BACKGROUND OF THE INVENTION

The present invention relates to parts made of ceramic matrix composite material. The invention relates more particularly to improving the surface state of such parts.

In aeroengines, and in particular in the gas turbines of such engines, parts that present aerodynamic shapes, such as blades, are conventionally made out of metal alloys using a casting method and local machining. Present and future requirements for aeroengines in terms of reducing specific energy consumption, reducing pollution, etc., are giving rise to a significant increase in the weight of such engines, in particular in the low pressure stages of their turbines.

The blades constitute a large part of the weight of low pressure stages. In order to reduce the weight significantly, while also accepting operating temperatures higher than those made possible with present metal alloys, one solution would be to make the blades out of ceramic matrix composite materials.

Ceramic matrix composite (CMC) materials are examples of so-called "thermostructural" composite materials, i.e. composite materials having good mechanical properties and the ability to conserve their properties at high temperature. In addition, such parts, such as blades, when made out of CMC present a significant saving in weight compared with the same parts made using the usual metal alloys.

In well-known manner, CMC parts are formed of fiber reinforcement made of refractory fibers (carbon fibers or ceramic fibers) and densified with a ceramic matrix, in particular a refractory carbide, nitride, oxide, . . . matrix. Typical examples of CMC materials are C—SiC materials (carbon fiber reinforcement and silicon carbide matrix), SiC—SiC materials, and C—C/SiC materials (matrix both of carbon and of silicon carbide). The fabrication of parts made out of CMC material is well known. The fiber reinforcement may be densified using a liquid technique (impregnation with a resin that is a precursor of the ceramic matrix and transformation of the resin into ceramic by curing and pyrolysis, which process may be repeated) or by using a gas technique (chemical vapor infiltration).

Nevertheless, CMC parts present a surface appearance that is undulating and relatively rough, which can be incompatible with the aerodynamic performance required of parts such as blades. The surface undulation is due to the fiber reinforcement, whereas the roughness is associated with the "sealcoat" ceramic matrix, in particular when the matrix is deposited by chemical vapor infiltration (CVI).

Conversely, parts made out of metal alloys and by the associated methods present a surface appearance that is smooth with very little roughness (of the order of 1 micrometers ($\mu m$)).

One solution for improving the surface state of a CMC part consists in applying a liquid composition to its surface, the liquid containing a ceramic precursor polymer, e.g. silicon carbide, and a refractory solid filler in the form of grains enabling a ceramic coating to be formed. The ceramic coating serves to smooth out the undulations present in the surface of the part. This step is followed by depositing ceramic, e.g. SiC, made using chemical vapor infiltration (CVI) for a duration of about 30 hours, thereby serving to bond together the grains of refractory filler. Such a method of treating the surface of a CMC part is described in Document US 2006/0141154.

Although that method makes it possible to improve significantly the surface state of a CMC part by reducing its undulations to 40 $\mu m$ and its surface roughness to values lying in the range 2 $\mu m$ to 5 $\mu m$ (conditioned by the CVI deposition of the ceramic), the need for additional CVI after the ceramic coating has been formed leads to a significant increase in the cost and in the length of time required for fabricating the part.

Consequently, there exists a need for a coating for smoothing the surface of a CMC part that is less penalizing in terms of the duration and the cost of fabricating the part. Such a smoothing coating may be formed by a vitreous coating that is deposited on the part.

Nevertheless, the vitreous smoothing coating needs to satisfy various conditions in order to be adapted to the structural and functional characteristics of CMC parts. The vitreous smoothing coating must in particular present, at least while it is being applied on the part, surface tension and possibly also viscosity that are adapted to smoothing, i.e. that make it possible for the coating to be spread easily and uniformly over the surface of the part. The smoothing coating must also have a coefficient of thermal expansion that is close to that of the CMC material of the part in order to avoid differential expansion in the part when it is exposed to high temperatures. Finally, the coating used must also present a melting temperature that is higher than the utilization temperature of the CMC part so as to guarantee the integrity of the coating at said temperature, which may be as high as 1100° C. for the blades of gas turbines, for example.

OBJECT AND SUMMARY OF THE INVENTION

An object of the present invention is to propose a method that does not present the above-mentioned drawbacks for obtaining CMC parts having a surface state that is well-controlled, and in particular that is compatible with applications that require aerodynamic performance.

To this end, the invention provides a method of smoothing the surface of a ceramic matrix composite material part that presents a surface that is undulating and rough, in which method, in accordance with the invention, a refractory vitreous coating or refractory glassmaking composition is also deposited on the surface of the composite material, the vitreous coating essentially containing silica, alumina, baryte, and lime.

Thus, by depositing a vitreous coating on the surface of the CMC material, the method makes it possible to improve considerably the surface state of the part, and to do so with treatment that is much faster and less expensive than chemical vapor infiltration.

In a variant implementation of the invention, prior to depositing the vitreous coating on the surface of the part, the method comprises forming a ceramic coating made by applying a liquid composition to the surface of the part, the liquid composition containing a ceramic precursor polymer and a solid refractory filler, curing the polymer, and transforming the cured polymer into ceramic by heat treatment.

Under such circumstances, depositing the vitreous coating also makes it possible to stabilize and reinforce the ceramic coating by binding together the grains of the solid filler and/or the particles of the ceramic coating.

Preferably, the vitreous coating contains, in percentages by weight: 55% to 70% silica, 5% to 20% alumina, 5% to 15% baryte, and 5% to 10% lime.

The vitreous coating may also contain at least one additional compound selected at least from an alkaline-earth oxide and an alkali oxide.

In an aspect of the invention the vitreous coating presents a melting temperature that is not less than 1300° C.

In another aspect, the vitreous coating presents a coefficient of thermal expansion departing by no more than $\pm 0.5 \times 10^{-6} K^{-1}$ from the coefficient of thermal expansion of the CMC material of the part.

The vitreous coating may be deposited on the part by plasma spraying or oxy-acetylene flame spraying.

In a variant, the vitreous coating may be deposited on the part by coating, with heat treatment of the deposited coating being performed subsequently.

The present invention also provides a CMC part in which its surface state is improved in accordance with the method of the invention, the accessible surface of the CMC part being covered in a vitreous coating essentially containing silica, alumina, baryte, and lime.

The vitreous coating may also contain at least one additional compound selected at least from an alkaline-earth oxide and an alkali oxide.

In a variant implementation of the invention, the part is also provided with a ceramic coating comprising a ceramic phase and a solid filler.

The part may in particular be a gas turbine blade.

BRIEF DESCRIPTION OF THE DRAWINGS

Other characteristics and advantages of the invention appear from the following description of particular embodiments of the invention, given as non-limiting examples and with reference to the accompanying drawings, in which.

DETAILED DESCRIPTION OF EMBODIMENTS

The present invention provides a method of smoothing the surface of a part made of ceramic matrix composite (CMC) material that presents a surface that is undulating and rough.

Figure 4:
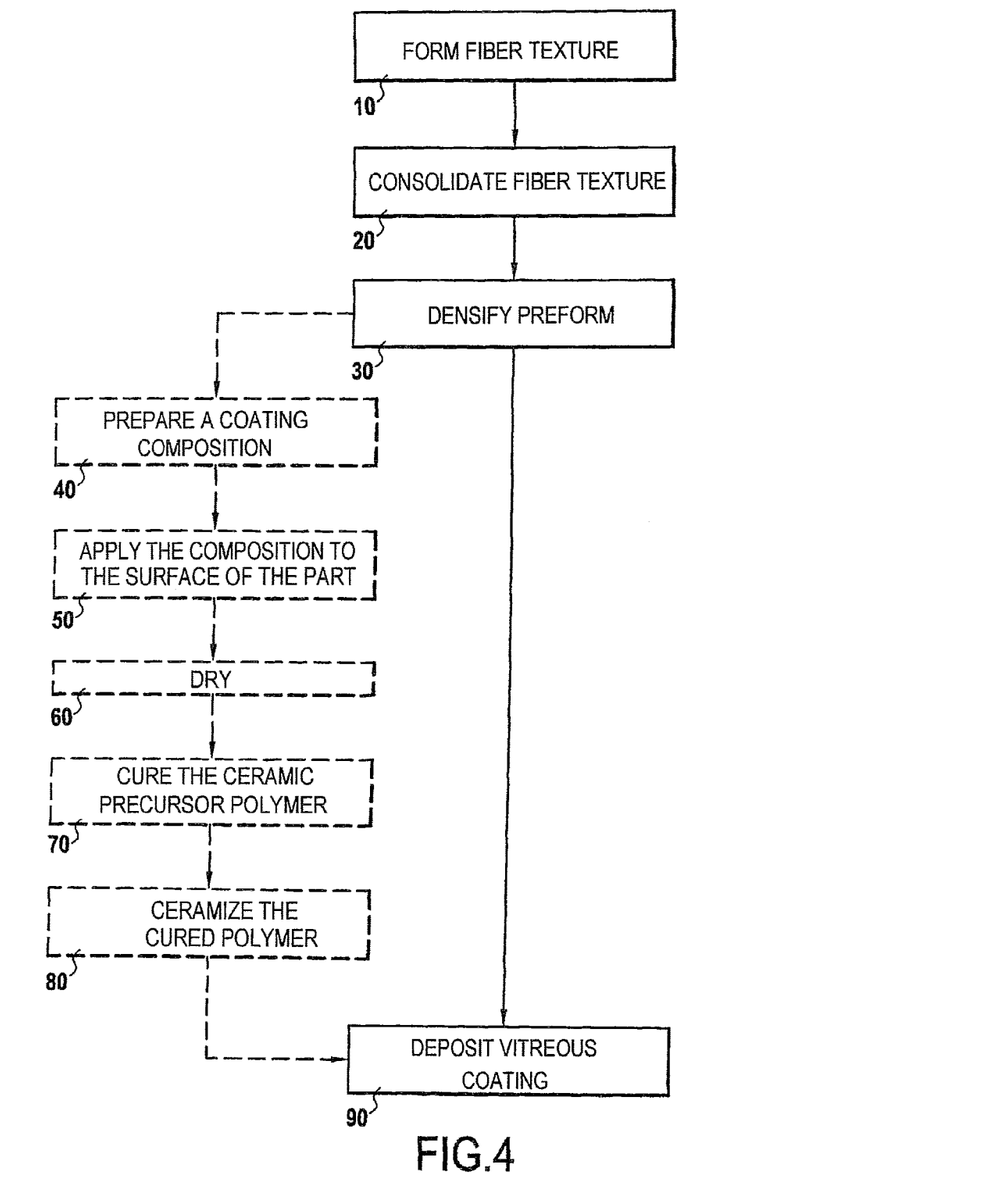
FIG. 4 is a flow chart showing successive steps of implementations of a method in accordance with the invention.

With reference to FIG. 4, a method of fabricating a CMC part implementing a smoothing method in accordance with the invention comprises the following steps.

Fabrication of a CMC part begins by proving a fiber structure from which a fiber preform is to be formed that has a shape that is close to that of the part that is to be fabricated (step 10).

The fiber structure may be in various forms, such as:
two-dimensional (2D) fabric;
three-dimensional (3D) fabric obtained by 3D weaving or as multiple layers;
braiding;
knitting;
felt; and
a unidimensional (UD) sheet of yarns or tows or multidirectional (MD) sheets obtained by superposing a plurality of UD sheets in different directions and bonding the UV sheets for example by stitching, by a chemical bonding agent, or by needling.

It is also possible to use a fiber structure made up of a plurality of superposed layers of woven fabric, braid, knitting, felt, sheets, etc., which layers are bonded together, e.g. by stitching, by implanting yarns or rigid elements, or by needling.

The fibers making up the fiber structure are refractory fibers, i.e. ceramic fibers, e.g. made of silicon carbide (SiC), carbon fibers, or indeed fibers made of a refractory oxide, e.g. of alumina ($Al_2O_3$).

Once the fiber texture has been made up, it is consolidated by being impregnated with a liquid composition containing a ceramic-precursor consolidation resin (step 20). For this purpose, the fiber texture is immersed in a bath containing the resin and usually a solvent therefor. After drip-drying, drying is finished off in a stove. Drying may be accompanied by pre-curing or partial curing of the resin. Such pre-curing provides additional stiffness, so if it is performed, it must remain limited in order to preserve sufficient deformability for the fiber texture.

Other known impregnation techniques may be used, such as preparing a pre-impregnated fabric by passing the fiber texture through a continuous impregnator, infusion impregnation, or indeed impregnation by resin transfer molding (RTM).

The consolidation resin is selected so that after pyrolysis it leaves sufficient ceramic residue to ensure consolidation of the subsequently-made fiber preform.

A ceramic-precursor resin may, for example, be a polycarbosilane resin that is a precursor of silicon carbide (SiC), or a polysiloxane resin that is a precursor of SiCO, or a polyborocarbosilazane resin that is a precursor of SiCNB, or a polysilazane resin (SiCN).

After impregnation, a fiber preform for constituting a fiber reinforcement of the part that is to be made, and having a shape that corresponds substantially to that of said part, is itself put into shape by conforming the fiber texture using support tooling.

The shaping of the fiber preform is preferably accompanied by compacting the fiber structure in order to increase the concentration per unit volume of fibers in the composite material of the part that is to be made.

After the preform has been shaped, the resin is cured, or curing is completed if there has been pre-curing, with the preform being held in tooling.

Thereafter, consolidation is finished off by heat treatment to pyrolyze the resin. Pyrolysis is performed at a temperature lying in the range about 900° C. to 1000° C., for example.

Consolidation may also be performed by chemical vapor infiltration (CVI).

After this consolidation, densification of the fiber preform by means of a ceramic matrix is continued (step 30).

Densification is advantageously performed by chemical vapor infiltration (CVI), with the parameters of the CVI process and the nature of the reaction gas being adapted to the nature of the matrix that is to be made. It is thus possible in a single oven to run on from the operation of pyrolyzing the consolidation resin to the operation of performing densification.

The ceramic matrix formed by CVI may be an SiC matrix, or a matrix that is at least in part self-healing, such as a silicon-boron-carbon (Si—B—C) matrix or a boron carbide ($B_4C$) matrix, or indeed a sequenced matrix having alternating phases of non-healing ceramic matrix and of healing ceramic matrix. Reference may be made in particular to the following documents:
FR 2 401 888, U.S. Pat. No. 5,246,736, U.S. Pat. No. 5,965,266, U.S. Pat. No. 6,068,930, and U.S. Pat. No. 6,291,058.

The ceramic matrix may be deposited in a plurality of successive infiltration cycles with a machining operation taking place between each of the cycles in order to reopen the surface pores of the material and facilitate depositing the matrix in the fiber reinforcement.

Figure 1:
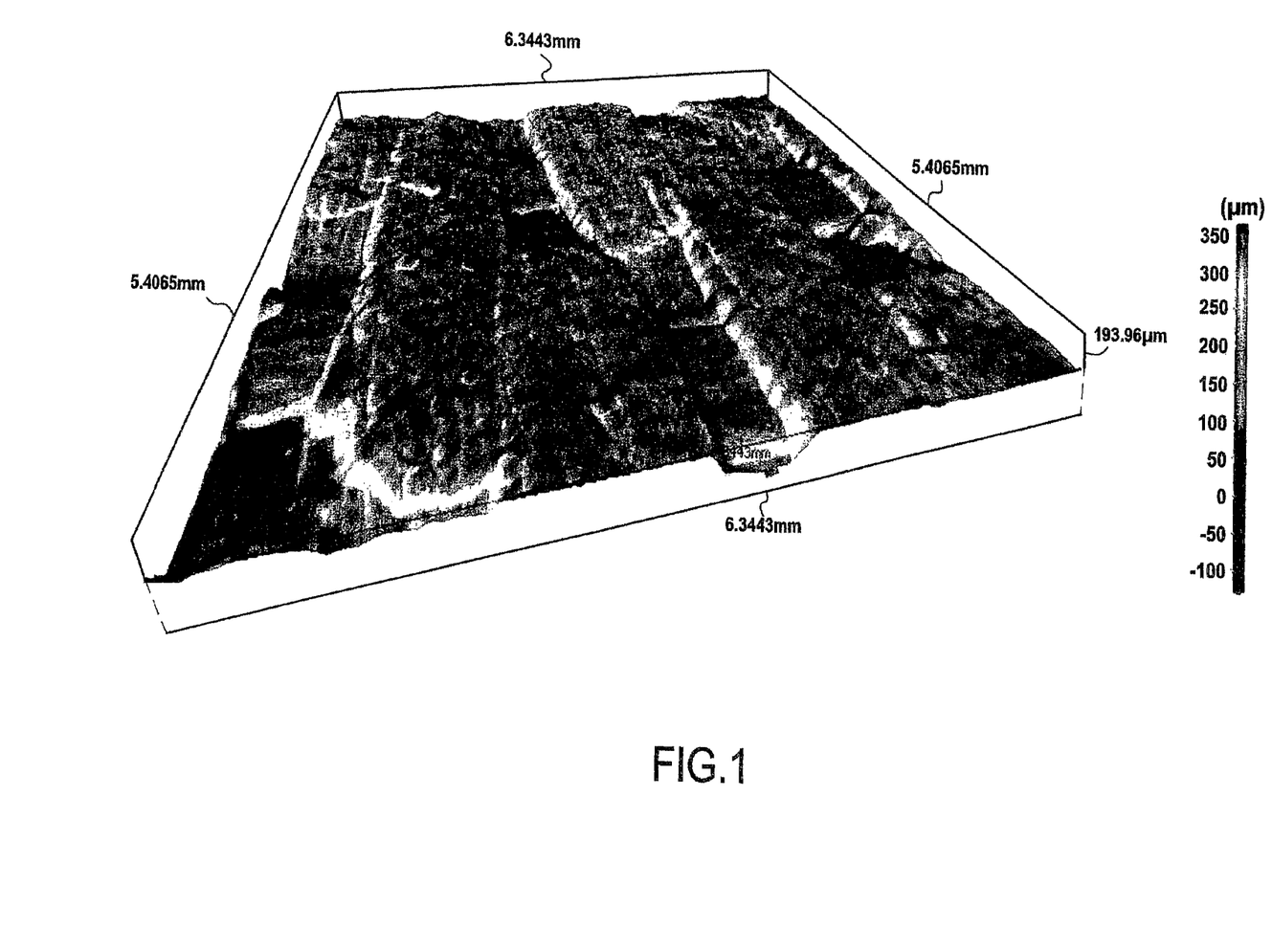
FIG. 1 is a three-dimensional view showing the surface state of a portion of a CMC part without additional surface treatment.
Figure 2:
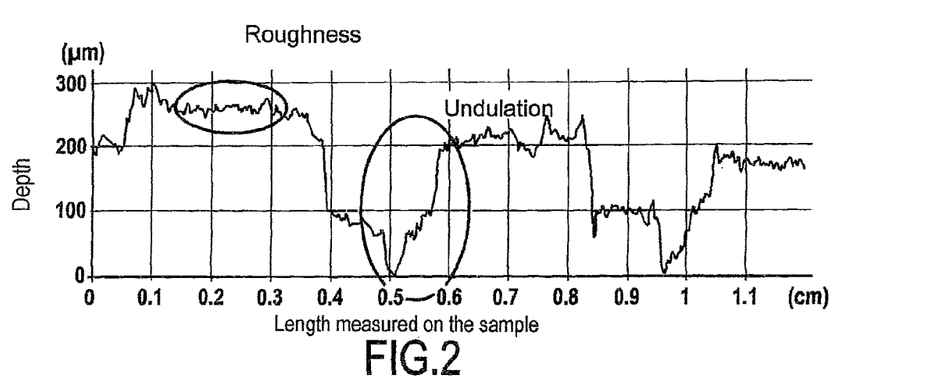
FIG. 2 is a curve showing measurements of dimensional variations in the portion of a part shown in FIG. 1.

FIG. 1 shows the surface state of a portion of a CMC part made from a consolidated multilayer fiber texture of three-dimensional weaving of SiC fibers (Guipex® base-8 satin), that has been shaped and densified using the above-described method. As shown in the measurements of FIG. 2, the part presents on its surface both undulations presenting an amplitude of more than 200 µm and roughness presenting a level of about 5 µm.

Figure 3:
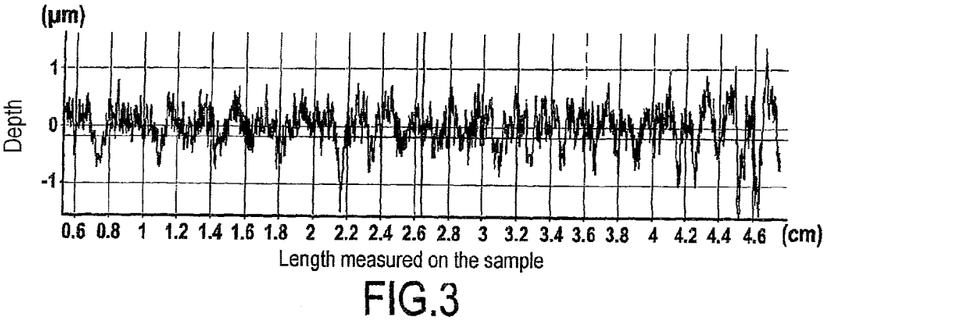
FIG. 3 is a curve showing measurements of dimensional variations at the surface of a metal part used for making blades of an aeroengine.

As explained above, such surface irregularity is unlikely to enable such a part to be used unchanged for aerodynamic applications. By way of comparison, FIG. 3 shows the measurements of the surface state of a blade for a low pressure stage of an aeroengine, where the blade is made of a metallic material. It can be seen that the blade does not present any undulations in its surface and presents a mean roughness level of the order of 1 µm.

For this purpose, and in accordance with an implementation of the invention, a refractory vitreous coating is deposited directly on the accessible surface of the CMC material of the part (step 90). The term "accessible surface" is used to mean the outside geometrical surface of the part, and also the surfaces of the pores internal to the material but that are open to the outside, i.e. to the pores that are accessible from the outside. In the implementation described herein, the coating is directly in contact with the CMC material of the part.

The composition of the deposited vitreous coating is selected so as to be compatible with the CMC material of the part. In particular, a coating composition is selected that presents a coefficient of thermal expansion that is relatively close to that of the CMC material part, i.e. that departs by no more than $\pm 0.5 \times 10^{-6} K^{-1}$ from the coefficient of thermal expansion of the CMC material of the part. By way of example, the vitreous coating presents a coefficient of thermal expansion lying in the range $4 \times 10^{-6} K^{-1}$ to $5 \times 10^{-6} K^{-1}$, the coefficient of thermal expansion of the CMC generally lying in the range 4 to 4.5. A vitreous coating composition is also selected so that it does not interact chemically with the CMC material.

The vitreous coating is also selected as a function of the conditions of utilization of the CMC part. In particular, it must be capable of withstanding the utilization temperatures of the part and it must present a lifetime that is not less than that defined for the part. To this end, a vitreous coating is selected that has a melting temperature higher than the maximum utilization temperature of the part. For example for parts constituting the blades of gas turbines, the maximum temperatures encountered by such parts may be as high as 1100° C. Under such circumstances, the vitreous coating should present a melting temperature not less than 1300° C.

The vitreous coating preferably contains the following percentages by weight:
55% to 70% silica ($SiO_2$);
5% to 20% alumina ($Al_2O_3$);
5% to 15% baryte (BaO); and
5% to 10% lime (CaO).

With such a composition, an alumino-silicate glass is formed with alkaline-earth fluxes that present a melting temperature higher than 1100° C., thereby forming a vitreous coating on the part that conserves its integrity up to utilization temperatures that may be as high as 1100° C. With the above-mentioned composition, the vitreous smoothing coating presents, at least during application on the part, a surface tension and possibly also a viscosity that are suitable for smoothing, i.e. that make it easy to spread the coating uniformly over the surface of the part. The smoothing coating also possesses a coefficient of thermal expansion that is close to that of the CMC material of the part in order to avoid differential expansion in the part when it is exposed to high temperatures.

Silica represents the base oxide for the composition.

Alumina, derived from natural mineral raw materials, serves to increase the melting temperature of the glass. It also makes it possible to adjust the coefficient of thermal expansion and the surface tension of the glass. By increasing the percentage of alumina in the composition of the vitreous coating, the coefficient of thermal expansion and the surface tension thereof are increased.

Baryte serves to adjust the duration of melting at high temperature of the glass, i.e. the length of time over which melting takes place. It also makes it possible to adjust the coefficient of thermal expansion, the viscosity, and the surface tension of the glass. By increasing the percentage of baryte in the composition of the vitreous coating, the coefficient of thermal expansion, the viscosity, and the surface tension thereof are decreased.

Lime serves to adjust the viscosity and the surface tension of the glass. By increasing the percentage of lime in the composition of the vitreous coating, the coefficient of thermal expansion and the viscosity are decreased while the surface tension thereof is increased.

The vitreous coating may also contain one or more additional compounds selected from alkaline-earth oxides, such as magnesia (MgO) or zirconia ($ZrO_2$), and alkali oxides such as sodium oxide ($Na_2O$) and potash ($K_2O$). By way of example, the vitreous coating may include, in addition to the silica, alumina, baryte, and lime, 0% to 5% magnesia and/or 0% to 10% zirconia and/or 0% to 5% sodium oxide.

The magnesia serves to adjust the surface tension of the glass. By increasing the percentage of magnesia in the composition of the vitreous coating, the surface tension thereof is increased.

Zirconia contributes to the mechanical properties of the glass. It also makes it possible to adjust the surface tension of the glass. By increasing the percentage of zirconia in the composition of the vitreous coating, the surface tension thereof is increased.

Sodium oxide serves to adjust the viscosity and the surface tension of the glass. By increasing the percentage of sodium oxide in the composition of the vitreous coating, the viscosity is decreased and the surface tension thereof is increased.

Generally speaking, in this type of glass composition, the use of alkaline-earth oxides (baryte, lime, magnesia, etc.) relative to conventional alkali oxides (sodium oxide, potash, etc.) serves to reduce the coefficient of thermal expansion for the highest utilization temperatures.

The vitreous coating may be obtained by depositing a starting composition and applying heat treatment at about 1350° C., which heat treatment may be performed simultaneously with the deposition or subsequently.

By way of example, the starting composition may contain the following raw materials:
sand to constitute the silica;
kaolin or clay to constitute mainly the alumina, and to a lesser extent the silica;
barium carbonate to constitute the baryte; and
calcium carbonate to constitute the lime.

The baryte is preferably formed from barium carbonate in order to form a metastable glass.

The composition may also contain the following additional raw materials:
- steatite mainly to constitute the magnesia and to a lesser extent the alumina;
- zirconium silicate (zircon) to form the zirconia; and
- soda feldspa to constitute the sodium oxide.

The quantities of the raw materials are adjusted in the starting composition as a function of the proportions of the components of the vitreous coating that it is desired to obtain.

As a non-limiting example, a first starting composition contains in percentage by weight:
- 39% silica sand;
- 9% kaolin;
- 5% clay;
- 10% barium carbonate;
- 7% calcium carbonate;
- 2% steatite; and
- 28% feldspa;

and serves to constitute a vitreous coating containing:
- 66% silica;
- 13% alumina;
- 10% baryte;
- 7% lime;
- 1% magnesia; and
- 3% sodium oxide.

In a second example, a starting composition containing the following percentages by weight:
- 31% silica sand;
- 8% kaolin;
- 5% clay;
- 10% barium carbonate;
- 7% calcium carbonate;
- 2% steatite;
- 10% zirconium silica; and
- 27% feldspa;

serves to constitute a vitreous coating containing:
- 61% silica;
- 12% alumina;
- 10% baryte;
- 7% lime;
- 1% magnesia;
- 6% zirconia; and
- 3% sodium oxide.

The vitreous coating may in particular be deposited on the CMC part by spraying or by coating.

When spraying is used, the composition should be in the form of a powder (feed material) that is sprayed onto the part, preferably by means of an oxy-acetylene flame or of a plasma, thereby enabling the temperature deposition on the material to be reduced and consequently enabling the heating of the part to be reduced. Plasma or oxy-acetylene flame spray deposition techniques are well known and are not described in greater detail for reasons of simplification.

Deposition by coating may be performed in particular by spraying, by applying a slip, or by dipping, the starting composition being maintained in suspension in water, for example. Under such circumstances, heat treatment needs to be applied in order to fix the vitreous coating on the part. The heat treatment is preferably performed locally, i.e. without subjecting the entire part to the heat treatment.

The thickness of the deposited vitreous coating is determined mainly as a function of the level of the irregularities that are to be compensated. The layer of vitreous coating presents thickness that may lie in the range 50 µm to 300 µm.

In a variant implementation of the invention, a ceramic coating may be performed on the accessible surface of the part before depositing the vitreous coating. Under such circumstances, after a fiber structure has been formed (step 10), and consolidated (step 20), and the preform has been densified (step 30), a ceramic coating composition is prepared (step 40). This composition comprises a solid refractory filler in the form of a powder, in particular a ceramic powder, a ceramic precursor polymer, and optionally a solvent for the polymer.

By way of example the powder is SiC powder. Its grain size is selected to be sufficiently fine to enable the grains of powder to penetrate into the surface pores for filling in the CMC composite material. The mean size of the grains is preferably selected to be less than 100 µm, e.g. lying in the range 5 µm to 50 µm. It is also possible to use powders of different grain sizes. For example, it is possible to use grains having a mean size lying in the range 5 µm to 15 µm in association with grains having a mean size lying in the range 25 µm to 50 µm, with the proportion by weight of grains of larger mean size being for example not less than that of the grains of the smaller mean size.

Other powders, in particular ceramic powders, may be used having substantially the same grain size, e.g. selected from powders of carbide (other than SiC), nitride, or boride, it being possible to mix powders of different kinds.

The ceramic precursor polymer is selected as a function of the nature of the desired coating. For an SiC coating, the polymer should be selected for example from polycarbosilane (PCS) and polytitanocarbosilane (PTCS).

Other ceramic precursor polymers can be used, for example, silicones which are precursors of SiC (or SiC+C, with excess carbon), polysilazanes that, when pyrolyzed under a gas, serve to obtain residues based on $Si_3N_4$ and/or SiC, and polyborazines that are precursors for BN.

It should be observed that the ceramic constituting the solid fillers and the ceramic for which the polymer is a precursor are preferably, but not necessarily, of the same kind.

The solvent is determined as a function of the ceramic precursor polymer used. For example, with PCS, the solvent may be xylene. Other solvents can be used for other polymers, e.g. heptane, hexane, methylethylketone, or ethanol for silicones.

The quantity of solid filler, compared with the quantity of ceramic precursor polymer is selected to ensure satisfactory filling of the surface pores of the thermostructural composite material, while enabling the composition to penetrate to a certain depth. Thus, the quantity by weight of solid filler preferably lies in the range 0.4 times to 4 times the quantity by weight of ceramic precursor polymer. This range also makes it possible to adjust the amount of shrinkage of the ceramic precursor polymer during its transformation.

The quantity of solvent used is selected to impart the appropriate viscosity to the liquid composition to enable it to be applied to the surface of the part.

By way of example, a typical composition for a composition that is to form an SiC coating may be selected from the following ranges:
- SiC powder (mean grain size lying in the range 5 µm to 50 µm): 2 parts by weight (pbw) to 7 pbw;
- PCS (SiC precursor): 1 pbw to 3 pbw; and
- xylene (PCS solvent): 2 pbw to 5 pbw.

The liquid composition is applied to the surface for treatment of the part (step 50).

Application may be performed merely by using a brush. However other methods may be used, e.g. a spray gun.

After drying (step 60), e.g. using hot air, in order to eliminate the solvent, the ceramic precursor polymer is cured (step 70). Curing may be performed by heat treatment. For example, when using PCS, the temperature is raised progressively up to a dwell at about 350° C.

The cured polymer is subjected to heat treatment for ceramization purposes (step 80). With PCS, the transformation into SiC is performed by raising the temperature progressively up to a dwell at about 900° C.

Several successive layers of liquid composition may be applied. After each layer has been applied, it is preferable to proceed with at least one operation of drying the composition and curing the ceramic precursor polymer. Ceramization may be performed simultaneously on all of the layers.

Naturally, the conditions for curing and for ceramization may be different when using other ceramic precursors, these conditions not presenting any original character.

A ceramic coating is thus obtained that includes a phase derived from ceramization of the ceramic precursor and a solid filler. This coating fills the undulations and the indentations in the surface of the part.

Nevertheless, the ceramic coating as formed in this way needs to be stabilized structurally. In particular, it is necessary to ensure bonding between the grains of solid filler because of the shrinkage of the ceramic precursor resin during its transformation. During heat treatment for the purposes of ceramization, the material constituting the ceramic precursor shrinks, thereby causing the ceramic to crack or to crumble. The grains are no longer all bonded to one another within a continuous block of ceramic.

For this purpose, and in accordance with the invention, a refractory vitreous coating is deposited on the ceramic coating under the conditions described above (step 60).

By forming a vitreous matrix, depositing a vitreous coating serves to bond the grains and/or particles of the ceramic coating together. Such impregnation also makes it possible to increase the wear strength of the CMC part (under conditions of uniform friction).

The vitreous coating is formed so as to compensate for the surface irregularities on the vitreous coating, with the quantity of vitreous coating being selected as a function of the irregularities that are to be compensated. The layer of vitreous coating presents thickness that may lie in the range 50 µm to 300 µm. The layer as formed in this way serves to smooth the surface of the ceramic coating and consequently the surface of the part. The vitreous coating of the invention serves to reduce the level of surface undulations in the part to values of less than 40 µm, and to reduce the level of surface roughness to values of less than 1 µm.

Figure 5:
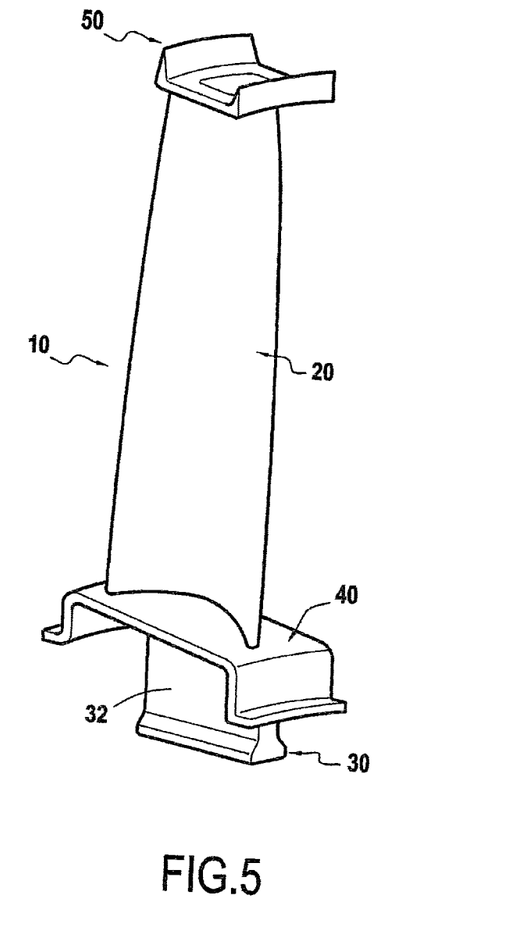
FIG. 5 is a perspective view of a turbomachine blade.

The invention is applicable to various types of turbomachine blade, in particular compressor and turbine blades of various gas turbine spools, such as that shown in FIG. 5.

The blade 10 of FIG. 5 compromises in well-known manner an airfoil 20, a root 30 made up of a portion of greater thickness, e.g. having a bulb-shaped section, and extended by a tang 32, a bottom platform 40 situated between the tang 42 and the airfoil 20, and an outer platform 50 in the vicinity of the free end of the blade.

The invention claimed is:

1. A part made of thermostructural composite material comprising fiber reinforcement made of refractory fibers and densified by a ceramic matrix, wherein an accessible surface of the part includes a vitreous coating comprising silica, alumina, BaO, and lime, and wherein the vitreous coating comprises, in percentages by weight, 55% to 70% of silica, 5% to 20% of alumina, 5% to 15% of BaO and 5% to 10% of lime.

2. A part according to claim 1, wherein the vitreous coating also contains at least one additional compound selected at least from an alkaline-earth oxide and an alkali oxide.

3. A part according to claim 1, further comprising a ceramic coating comprising a ceramic phase with a solid filler, the vitreous coating covering the ceramic coating.

4. A part according to claim 1, constituting a gas turbine blade.

5. A turbomachine including a blade according to claim 4.

* * * * *